US00RE42752E

(19) United States
(12) Reissued Patent
Higuchi et al.

(10) Patent Number: US RE42,752 E
(45) Date of Reissued Patent: Sep. 27, 2011

(54) THREE-PIECE SOLID GOLF BALL

(75) Inventors: Hiroshi Higuchi, Yokohama (JP); Hisashi Yamagishi, Yokohama (JP); Yoshinori Egashira, Hidaka (JP); Tadatoshi Yamada, Mitaka (JP)

(73) Assignee: Bridgestone Sports Co., Ltd., Tokyo (JP)

( * ) Notice: This patent is subject to a terminal disclaimer.

(21) Appl. No.: 11/111,974

(22) Filed: Apr. 22, 2005

Related U.S. Patent Documents

Reissue of:
(64) Patent No.: 5,553,852
Issued: Sep. 10, 1996
Appl. No.: 08/271,953
Filed: Jul. 8, 1994

U.S. Applications:
(63) Continuation of application No. 10/183,147, filed on Jun. 28, 2002.

(30) Foreign Application Priority Data

Jul. 8, 1993 (JP) ..... 5-193065

(51) Int. Cl.
*A63B 37/06* (2006.01)

(52) U.S. Cl. ..... 473/373; 473/378

(58) Field of Classification Search ..... 473/351, 473/373, 374, 367, 368, 370, 371, 376, 377, 473/378

See application file for complete search history.

(56) References Cited

U.S. PATENT DOCUMENTS

| | | | |
|---|---|---|---|
| 2,741,480 | A | 4/1956 | Smith |
| 2,973,800 | A | 3/1961 | Muccino |
| 3,053,539 | A | 9/1962 | Piechowski |
| 3,264,272 | A | 8/1966 | Rees |
| 3,313,545 | A | 4/1967 | Bartsch |
| 3,437,718 | A | 4/1969 | Rees |
| 3,454,280 | A | 7/1969 | Harrison et al. |
| 3,458,205 | A | 7/1969 | Smith et al. |

(Continued)

FOREIGN PATENT DOCUMENTS

| | | |
|---|---|---|
| CA | 2 137 841 | 12/1994 |

(Continued)

OTHER PUBLICATIONS

*Bridgestone Sports Co., Ltd* v. *Callaway Golf Company et al.;* United States District Court for the Northern District of Georgia, Atlanta Division (Civil Action No., 1 00-CV-1871), fully briefed Motion for Partial Summary Judgement.

(Continued)

*Primary Examiner* — Raeann Trimiew
(74) *Attorney, Agent, or Firm* — Sughrue Mion, PLLC

(57) ABSTRACT

A three-piece solid golf ball comprising a center core, an intermediate layer, and a cover. The center core (1) has a diameter of at least 29 mm, a hardness in the range of 45-80 JIS C and a specific gravity of less than 1.4. The intermediate layer (2) has a thickness of at least 1 mm, a specific gravity of less than 1.2, and a hardness of at least 85 on JIS C scale. The cover (3) has a thickness of 1-3 mm and a hardness of 50-85 JIS C. The ball has a good total balance of properties in that feeling and controllability are improved at no sacrifice of flying performance and durability.

1 Claim, 1 Drawing Sheet

U.S. PATENT DOCUMENTS

| | | | |
|---|---|---|---|
| 3,502,338 | A | 3/1970 | Cox |
| 3,534,965 | A | 10/1970 | Harrison et al. |
| 3,572,721 | A | 3/1971 | Harrison et al. |
| 3,819,768 | A | 6/1974 | Molitor |
| 3,883,145 | A | 5/1975 | Cox et al. |
| 3,989,568 | A | 11/1976 | Isaac |
| 4,076,255 | A | 2/1978 | Moore et al. |
| 4,085,937 | A | 4/1978 | Schenk |
| 4,123,061 | A | 10/1978 | Dusbiber |
| 4,272,079 | A | 6/1981 | Nakade et al. |
| 4,274,637 | A | 6/1981 | Molitor |
| 4,337,946 | A | 7/1982 | Saito et al. |
| 4,431,193 | A | 2/1984 | Nesbitt |
| 4,570,937 | A | 2/1986 | Yamada |
| 4,650,193 | A | 3/1987 | Molitor et al. |
| 4,674,751 | A | 6/1987 | Molitor et al. |
| 4,679,795 | A | 7/1987 | Melvin et al. |
| 4,688,801 | A | 8/1987 | Reiter |
| 4,690,981 | A | 9/1987 | Statz |
| 4,714,253 | A | 12/1987 | Nakahara et al. |
| 4,720,111 | A | 1/1988 | Yamada |
| 4,781,383 | A | 11/1988 | Kamada et al. |
| 4,798,386 | A | 1/1989 | Berard |
| 4,848,770 | A | 7/1989 | Shama |
| 4,852,884 | A | 8/1989 | Sullivan |
| 4,858,923 | A | 8/1989 | Gobush et al. |
| 4,858,924 | A | 8/1989 | Saito et al. |
| 4,863,167 | A | 9/1989 | Matsuki et al. |
| 4,884,814 | A | 12/1989 | Sullivan |
| 4,911,451 | A | 3/1990 | Sullivan et al. |
| 4,919,434 | A | 4/1990 | Saito |
| 4,968,038 | A | 11/1990 | Yamada |
| 4,979,746 | A | 12/1990 | Gentiluomo |
| 4,984,804 | A | 1/1991 | Yamada et al. |
| 4,986,545 | A | 1/1991 | Sullivan |
| 5,002,281 | A | 3/1991 | Nakahara et al. |
| 5,019,319 | A | 5/1991 | Nakamura et al. |
| 5,026,067 | A | 6/1991 | Gentiluomo |
| 5,048,838 | A | 9/1991 | Chikaraishi et al. |
| 5,068,151 | A | 11/1991 | Nakamura |
| 5,072,944 | A | 12/1991 | Nakahara et al. |
| 5,096,201 | A | 3/1992 | Egashira et al. |
| 5,098,105 | A | 3/1992 | Sullivan |
| 5,104,126 | A | 4/1992 | Gentiluomo |
| 5,120,791 | A | 6/1992 | Sullivan |
| 5,156,405 | A | 10/1992 | Kitaoh et al. |
| 5,184,828 | A | 2/1993 | Kim et al. |
| 5,187,013 | A | 2/1993 | Sullivan |
| 5,197,740 | A | 3/1993 | Pocklington et al. |
| 5,222,739 | A | 6/1993 | Horiuchi et al. |
| 5,244,969 | A | 9/1993 | Yamada |
| 5,253,871 | A | 10/1993 | Viollaz |
| 5,255,922 | A | 10/1993 | Proudfit |
| 5,273,286 | A | 12/1993 | Sun |
| 5,273,287 | A | 12/1993 | Molitor et al. |
| 5,274,041 | A | 12/1993 | Yamada |
| 5,281,651 | A | 1/1994 | Arjunan et al. |
| 5,304,608 | A | 4/1994 | Yabuki et al. |
| 5,306,760 | A | 4/1994 | Sullivan |
| 5,312,857 | A | 5/1994 | Sullivan |
| 5,314,187 | A | 5/1994 | Proudfit |
| 5,324,783 | A | 6/1994 | Sullivan |
| 5,328,959 | A | 7/1994 | Sullivan |
| 5,334,673 | A | 8/1994 | Wu |
| 5,338,610 | A | 8/1994 | Sullivan |
| 5,368,304 | A | 11/1994 | Sullivan et al. |
| 5,403,010 | A | 4/1995 | Yabuki et al. |
| 5,433,447 | A | 7/1995 | Pocklington |
| 5,439,227 | A | 8/1995 | Egashira et al. |
| 5,470,075 | A | 11/1995 | Nesbitt et al. |
| 5,482,285 | A | 1/1996 | Yabuki et al. |
| 5,490,673 | A | 2/1996 | Hiraoka |
| 5,490,674 | A | 2/1996 | Hamada et al. |
| 5,492,972 | A | 2/1996 | Stefani |
| 5,553,852 | A | 9/1996 | Higuchi et al. |
| 5,586,950 | A | 12/1996 | Endo |
| 5,733,206 | A | 3/1998 | Nesbitt et al. |
| 5,803,831 | A | 9/1998 | Sullivan et al. |
| 5,836,833 | A | 11/1998 | Shimosaka et al. |
| 5,876,294 | A | 3/1999 | Yamagishi et al. |
| 6,210,293 | B1 | 4/2001 | Sullivan |
| 6,213,894 | B1 | 4/2001 | Sullivan et al. |
| 2001/0000506 | A1 | 4/2001 | Sullivan |

FOREIGN PATENT DOCUMENTS

| | | | |
|---|---|---|---|
| EP | 0 589 647 | | 9/1993 |
| EP | 0 630 665 | | 5/1994 |
| EP | 0 637 459 | A1 | 7/1994 |
| FR | 2666018 | | 2/1992 |
| GB | 494031 | | 10/1938 |
| GB | 2 185 890 | | 8/1987 |
| GB | 2 228 874 | | 9/1990 |
| GB | 2 232 162 | | 12/1990 |
| GB | 2 245 580 | | 1/1992 |
| GB | 2 248 067 | | 3/1992 |
| GB | 2 264 302 | | 11/1992 |
| GB | 2 278 609 | | 12/1994 |
| GB | 2 291 811 | | 7/1996 |
| GB | 2 291 812 | | 7/1996 |
| JP | 58-923372 | | 6/1983 |
| JP | 59-169865 | | 11/1984 |
| JP | 61-168374 | | 7/1986 |
| JP | 63-105774 | | 5/1988 |
| JP | 63-61029 | | 11/1988 |
| JP | 64-80377 | | 3/1989 |
| JP | 2-28987 | | 6/1990 |
| JP | 2-228978 | | 9/1990 |
| JP | 2-264674 | | 10/1990 |
| JP | 3-3501 | | 1/1991 |
| JP | 3-9769 | | 1/1991 |
| JP | 3-75186 | | 11/1991 |
| JP | 4-48473 | | 8/1992 |
| JP | 4-49427 | | 8/1992 |
| JP | 4-55077 | | 9/1992 |
| JP | 4-244174 | | 9/1992 |
| JP | 5-4110 | | 1/1993 |

OTHER PUBLICATIONS

Test Report to Sumitomo Rubber Industries, Ltd., Chemical Inspection and Testing Institute, Osaka, Japan, dated Oct. 11, 1989.
Selector Guide for Molding and Extrusion Surlyn Ionomer Resin, Du Pont USA.
Expert Report of John Calabria dated Feb. 20, 2007.
Invalidity Expert Report of Dr. David Felker dated Jan. 16, 2007.

THREE-PIECE SOLID GOLF BALL

Matter enclosed in heavy brackets [ ] appears in the original patent but forms no part of this reissue specification; matter printed in italics indicates the additions made by reissue.

*More than one reissue application has been filed. This reissue application is a continuation of Reissue application Ser. No. 10/183,147, filed Jun. 28, 2002, which is a reissue of U.S. Pat. No. 5,553,852, which issued on Sep. 10, 1996 from application Ser. No. 08/271,953, filed Jul. 8, 1994; the disclosures of which are incorporated herein by reference.*

BACKGROUND OF THE INVENTION

1. Field of the Invention

This invention relates to three-piece solid golf balls comprising a center core, an intermediate layer, and a cover and more particularly, to three-piece solid golf balls which are improved in feeling on impact, controllability, and durability.

2. Prior Art

Among a variety of golf balls, thread-wound golf balls and solid golf balls are now popular. The solid golf balls are currently increasing to be a mainstream product. Among them, two-piece solid golf balls consisting of a core and a cover are most widespread.

Most amateur golfers are fond of two-piece solid golf balls which have excellent flying performance and durability although these balls have the disadvantages of a very hard feel on hitting and low control due to rapid ball separation on hitting. For this reason, many of professional golfers and skilled amateur golfers who impose weight on feeling and control prefer wound golf balls, especially wound golf balls using a soft balata cover, to two-piece solid golf balls. The wound golf balls are superior in feeling and control, but inferior in flying distance and durability to the two-piece solid golf balls.

Under the present situation that two-piece solid golf balls and wound golf balls have contradictory characteristics as mentioned above, players make a choice of golf balls depending on their own skill and taste.

In order to develop solid golf balls having a hitting feel approximate to the wound golf balls, two-piece solid golf balls of the soft type have been considered. For such two-piece solid golf balls of the soft type, soft cores must be used. If the cores are soft, however, repulsion becomes low with a concomitant loss of flying performance and durability is considerably deteriorated. That is, the superior flying performance and durability which are a characteristic of two-piece solid golf balls are lost, and in an extreme case, the balls become unacceptable for practical use.

Controllability, which is required even on full shots with drivers, is most important on control shots like approach shots. In an exemplary situation that the next shot should fly beyond the bunker and a short distance from the green edge to the cup, the player who is either professional or amateur will naturally wish to hit a ball with a minimal run. Such controllability of a golf ball largely depends on spin properties.

On a full shot with a club having a relatively large loft, the club loft is dominant to that the ball itself so that almost all balls are given an appropriate amount of spin and few balls overrun. However, on a approach shot over a short distance of 30 or 50 yards, balls will significantly vary in run or controllability. The major factor causing such a difference is not a basic structure, but the identity of cover material. In two-piece solid golf balls, however, covers made of soft material are effective for improving controllability, but detrimental for gaining flying distance.

SUMMARY OF THE INVENTION

Therefore, an object of the present invention is to provide a solid golf ball which is improved in feeling and controllability while maintaining the superior flying performance and durability which are characteristic of solid golf balls, that is, improved in total balance.

In connection with a solid golf ball having a core forming the center and a cover forming the outermost layer, the inventors have found that by providing a relatively hard intermediate layer between the center core and the cover, and controlling the size and specific gravity of the core, intermediate layer and cover, the center core and [core] *the cover* can be made relatively soft to improve feeling and controllability without deteriorating flying performance and durability. The feeling and controllability can be improved in a favorable way.

Briefly stated, an intermediate layer having a thickness of at least 1 mm, a specific gravity of less than 1.2, and a hardness of at least 85 on JIS C scale is formed around a center core having a diameter of at least 29 mm and a specific gravity of less than 1.4 and greater than the intermediate layer specific gravity. A cover having a thickness of 1 to 3 mm is formed on the outer surface of the intermediate layer to complete a solid golf ball. Then even when the center core is softened to a JIS C scale hardness of 45 to 80 and the cover softened to a JIS C scale hardness of 50 to 85, the feeling and controllability can be improved at no sacrifice of flying distance and durability. Further when the intermediate layer is formed of a resin composition based on a high repulsion ionomer resin, the hitting feel and controllability can be further improved with no sacrifice of flying distance and durability.

The present invention provides a three-piece solid golf ball comprising a center core, an intermediate layer, and a cover wherein the center core has a diameter of at least 29 mm and a specific gravity of less than 1.4, the intermediate layer has a thickness of at least 1 mm, a specific gravity of less than 1.2, and a hardness of at least 85 on JIS C scale. The cover has a thickness of 1 to 3 mm. The specific gravity of the intermediate layer is lower than the specific gravity of the center core. In one preferred embodiment, the intermediate layer is formed of a composition based on a high repulsion ionomer resin.

BRIEF DESCRIPTION OF THE DRAWING

The sole figure.

DETAILED DESCRIPTION OF THE INVENTION

Figure 1:
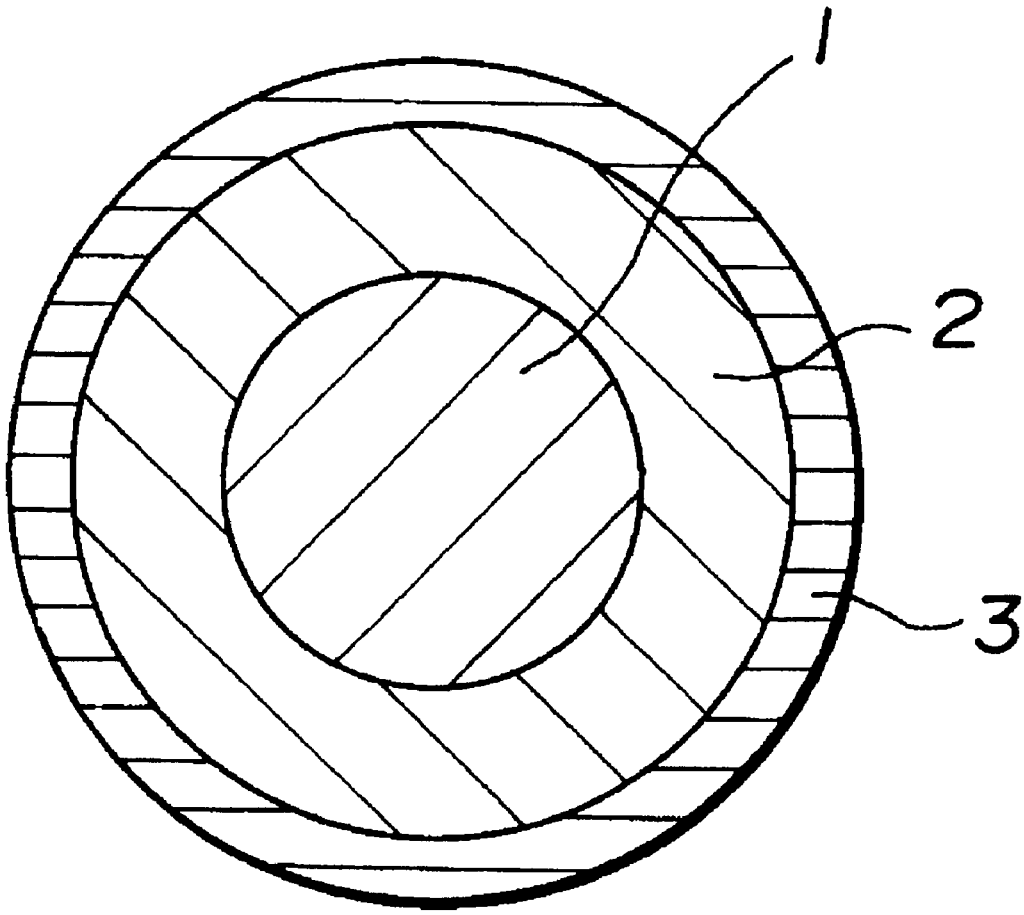
FIG. 1 is a schematic cross section of a three-piece solid golf ball according to the invention.

Referring to FIG. 1, there is schematically illustrated a typical three-piece solid golf ball according to the invention. The ball includes a spherical center core 1 forming the center of the ball and a cover 3 forming the outermost layer of the ball. A relatively hard intermediate layer 2 is disposed between the core 1 and the cover 3. The size and specific gravity of the core 1, intermediate layer 2, and cover 3 are set in specific ranges.

The center core has a diameter of at least 29 mm, preferably 29 to 37 mm and a specific gravity of less than 1.4, preferably 1.05 to 1.38. With a diameter of less than 29 mm, the intermediate layer must be relatively thick with losses of repulsion and feeling. With a specific gravity of 1.4 or more, the ball has a heavier weight which exceeds the weight requirement of golf balls.

On an impact entailing substantial deformation as found on driver shots, the player gets a feeling which largely depend on the hardness of the center core 1 and varies with the club head speed given by the player. Therefore, the hardness of the center core 1 should be set in accordance with the head speed of the target players. In this sense, the center core hardness is not particularly limited although it preferably ranges from 45 to 80, more preferably from 60 to 80 on JIS C scale (at the center core surface).

The center core 1 is generally formed from a well-known rubber composition comprising a base rubber, co-crosslinking agent and peroxide through heating, pressing and molding steps. The base rubber may be one conventionally used in solid golf balls and preferably be selected from polybutadiene rubber and mixtures of polybutadiene rubber and polyisoprene rubber. Use of 1,4-polybutadiene rubber containing more than 90% of cis structure is preferred for high repulsion. The co-crosslinking agents used in conventional solid golf balls include zinc and magnesium salts of unsaturated fatty acids such as methacrylic acid and acrylic acid and esters of unsaturated fatty acids such as trimethylpropane trimethacrylate and they may be used in the present invention. Zinc acrylate is preferred for high repulsion. The co-crosslinking agent is blended in amounts of about 15 to 30 parts by weight per 100 parts by weight of the base rubber. The peroxide may be selected from a variety of peroxides, preferably dicumyl peroxide and mixtures of dicumyl peroxide and 1,1-bis(t-butylperoxy)-3,3,5-trimethylcyclohexane. The peroxide is blended in amounts of about 0.5 to 1 part by weight per 100 parts by weight of the base rubber. If desired, zinc oxide and barium sulfate may be blended in the rubber composition for specific gravity adjustment while antioxidants may also be blended.

The intermediate layer 2 has a radial thickness of at least 1 mm, preferably 1.5 to 3.5 mm, a specific gravity of less than 1.2, preferably 0.9 to 1 and lower than the center core specific gravity, and a hardness of at least 85, preferably 85 to 100 on JIS C scale. With a thickness of less than 1 mm, repulsion is lowered to reduce flying distance. With a specific gravity of 1.2 or more, the center core must have a relatively low specific gravity so that the golf ball may be increased in inertia moment and reduced in spin property and thus lose some controllability. A similar detrimental effect is observed when the intermediate layer specific gravity is greater than the center core specific gravity. A layer with a JIS C scale hardness of less than 85 detracts from flying performance. The intermediate layer preferably has an outer diameter of 38 to 41 mm though not limited thereto. Also preferably the difference in specific gravity between the center core and the intermediate layer is 0.1 or more, especially 0.1 to 0.5 though not limited thereto.

The intermediate layer 2 is effective in compensating for lowering repulsion of the center core 1 which is made soft. It is then formed of a relatively hard (JIS C scale hardness≧85), repulsive material. Although the material is not critical, preferred materials are ionomer resins, for example, Himilan 1706 and 1605 commercially available from Mitsui-dupont Polychemical K.K. and Surlyn commercially available from E.I. dupont. A 1:1 blend of Himilan 1706 and Himilan 1605 is most preferred. In addition to the ionomer resin, the composition of which the intermediate layer is formed may further contain weight control agents, for example, inorganic fillers such as zinc oxide and barium sulfate, coloring agents such as titanium dioxide, and other additives.

The cover 3 has a radial thickness of 1 to 3 mm, preferably 1.5 to 2.5 mm. A cover more than 3 mm thick is low in repulsion whereas a cover less than 1 mm thick is low in durability such as cut resistance. Although the hardness of the cover 3 is not particularly limited, it is preferably set in a relatively soft range of 50 to 85, more preferably 60 to 85 on JIS C scale because in this range, improvements in all of repulsion (flying performance), durability and controllability are expected.

The cover 3 is generally formed of resinous materials which are conventionally used as the cover of solid golf balls, preferably those materials which are relatively soft (JIS C scale hardness 50 to 85) and highly repulsive. Examples include ionomer resins such as Himilan 1650 commercially available from Mitsui-dupont Polychemical K.K., Surlyn 8120 commercially available from E.I. dupont, and mixtures thereof, thermoplastic polyester elastomers such as Hytrel 4047 commercially available from Toray-dupont K.K., and balata resins. If necessary, inorganic fillers may be blended in these resins for coloring purposes.

EXAMPLE

Examples of the present invention are given below by way of illustration and not by way of limitation.

Examples and Comparative Examples

Using a center core, intermediate layer, and cover having the composition shown in Table 1, three-piece solid golf balls (Examples 1-6, Comparative Examples 1-3) were prepared. The center core was prepared by kneading the respective components in a roll mill and pressure molding at 155° C. for 15 minutes. The intermediate layer was formed by injection molding so as to enclose the outer surface of the center core. The cover was formed around the intermediate layer by injection molding. The three-piece solid golf balls were completed in this way. The parameters associated with the core, intermediate layer and cover are shown in Table 2.

The golf balls were evaluated for spin characteristic, flying performance, feeling, and durability by the following tests. The results are shown in Table 2.

Spin Characteristic

Using a swing robot manufactured by True Temper Co., the ball was hit by the driver at a head speed of 45 m/s (abbreviated as W1 HS45 in Table 2) and by the sand wedge at a head speed of 17.6 m/s (abbreviated as SW HS17.6 in Table 2). The ball spin (rpm) was observed using a science eye (manufactured by Bridgestone Corporation).

Feeling

Professional golfers evaluated a feeling on impact according to the following criterion.

○: good
Δ: average
×: poor

Flying Performance

In the spin and feeling tests, the flying distance the ball traveled was also measured. Total evaluation was made according to the following criterion.

○: good
Δ: average
×: poor

Durability

Using a flywheel hitting machine, the ball was repeatedly hit at a head speed of 38 m/s until the ball was broken. With the number of hits counted, the ball was rated according to the following criterion.

○: good
Δ: average
×: poor

TABLE 1

| | Example | | | | | | Comparative Example | | |
|---|---|---|---|---|---|---|---|---|---|
| | 1 | 2 | 3 | 4 | 5 | 6 | 1 | 2 | 3 |
| Center core | | | | | | | | | |
| Cis-1,4-polybutadiene | 100 | 100 | 100 | 100 | 100 | 100 | 100 | 100 | 100 |
| Zinc acrylate | 20 | 20 | 20 | 30 | 20 | 20 | 20 | 25 | 20 |
| Zinc oxide | 56 | 36 | 36 | 20 | 23 | 10 | 90 | 2.5 | 55 |
| Antioxidant | 0.2 | 0.2 | 0.2 | 0.2 | 0.2 | 0.2 | 0.2 | 0.2 | 0.2 |
| Dicumyl peroxide | 0.65 | 0.65 | 0.65 | 0.65 | 0.65 | 0.65 | 0.65 | 0.65 | 0.65 |
| Intermediate layer | | | | | | | | | |
| Himilan 1706 | 50 | 50 | 50 | 50 | 50 | 50 | 50 | 50 | 50 |
| Himilan 1605 | 50 | 50 | 50 | 50 | 50 | 50 | 50 | 50 | 50 |
| Cover | | | | | | | | | |
| Himilan 1650 | 50 | 50 | 50 | | | 50 | 50 | | 50 |
| Surlyn 8120 | 50 | 50 | 50 | | | 50 | 50 | | 50 |
| Hytrel 4047 | | | | 100 | | | | 100 | |
| Trans-isoprene rubber | | | | | 90 | | | | |
| Natural rubber | | | | | 10 | | | | |

Note:
The amounts of components blended are parts by weight and their proportion is independent among the center core, intermediate layer, and cover.

TABLE 2

| | Example | | | | | | Comparative Example | | |
|---|---|---|---|---|---|---|---|---|---|
| | 1 | 2 | 3 | 4 | 5 | 6 | 1 | 2 | 3 |
| Center core | | | | | | | | | |
| Outer diameter, mm | 31.52 | 35.28 | 35.28 | 35.28 | 35.29 | 36.40 | 27.68 | 35.24 | 31.52 |
| Hardness, JIS C | 66 | 66 | 66 | 79 | 66 | 66 | 66 | 73 | 66 |
| Specific gravity | 1.36 | 1.24 | 1.24 | 1.19 | 1.16 | 1.07 | 1.56 | 1.19 | 1.35 |
| Intermediate layer | | | | | | | | | |
| Thickness, mm | 3.4 | 1.7 | 2.2 | 2.2 | 1.7 | 2.0 | 5.7 | 1.8 | 1.6 |
| Hardness, JIS C | 91 | 91 | 91 | 91 | 91 | 91 | 91 | 82 | 91 |
| Specific gravity | 0.95 | 0.95 | 0.95 | 0.95 | 0.95 | 0.95 | 0.95 | 0.97 | 0.95 |
| Outer diameter, mm | 38.35 | 38.73 | 39.65 | 39.66 | 38.73 | 40.40 | 39.00 | 38.91 | 34.56 |
| Cover | | | | | | | | | |
| Thickness, mm | 2.2 | 2.0 | 1.5 | 1.5 | 2.0 | 1.8 | 1.8 | 1.9 | 4.0 |
| Specific gravity | 0.97 | 0.97 | 0.97 | 1.10 | 1.13 | 0.97 | 0.97 | 1.10 | 0.97 |
| Hardness, JIS C | 82 | 82 | 82 | 61 | 78 | 82 | 82 | 61 | 82 |
| Ball | | | | | | | | | |
| Outer diameter, mm | 42.68 | 42.67 | 42.67 | 42.70 | 42.70 | 44.00 | 42.65 | 42.63 | 42.65 |
| Weight, g | 45.50 | 45.45 | 45.50 | 45.55 | 45.53 | 45.60 | 45.50 | 45.55 | 45.50 |
| Performance | | | | | | | | | |
| Spin (rpm) W1 HS45 | 3300 | 3020 | 3030 | 3920 | 3600 | 3030 | 35 | 3600 | 3250 |
| SW HS17.6 | 3900 | 4000 | 4300 | 6390 | 5800 | 4100 | 4100 | 4050 | 3500 |
| Feeling | Δ | ○ | ○ | Δ | ○ | ○ | X | ○ | ○ |
| Flying performance | ○ | ○ | ○ | ○ | Δ | ○ | X | X | X |
| Durability | ○ | ○ | ○ | ○ | ○ | ○ | ○ | ○ | ○ |

As is evident from Table 2, the three-piece solid golf balls of the present invention have a good balance of properties in that the center core and cover can be made soft to ensure a pleasant feeling and controllability (spin) without deteriorating flying performance and durability.

There has been described a three-piece solid golf ball which includes a core, intermediate layer and cover having controlled size, hardness and specific gravity so that the ball has a good total balance of properties in that a relatively soft center core and cover are used to ensure a pleasant feeling and controllability at no sacrifice of flying performance and durability.

Japanese Patent Application No. 5-193065 is incorporated herein by reference.

Although one preferred embodiment have been described, many modifications and variations may be made thereto in the light of the above teachings. It is therefore to be understood that within the scope of the appended claims, the invention may be practiced otherwise than as specifically described.

We claim:

[1. A three-piece solid golf ball comprising;

a center core, an intermediate layer, and a cover enclosing the core through the intermediate layer, said center core having a diameter of at least 29 mm and a specific gravity of less than 1.4, said intermediate layer having a thickness of at least 1 mm, a specific gravity of less than 1.2, and a hardness of at least 85 on JIS C scale, the specific gravity of said intermediate layer being lower than the specific gravity of said center core, and said cover having a thickness of 1 to 3 mm and being softer than said intermediate layer.]

[2. The golf ball of claim 1 wherein said intermediate layer is formed of a high repulsion ionomer resin base composition.]

[3. The golf ball of claim 1 wherein said center core has a hardness of 45 to 80 on JIS C scale and said cover has a hardness of 50 to 85 on JIS C scale.]

[4. The golf ball of claim 1 wherein said center core is comprised of a polybutadiene base rubber composition.]

[5. The golf ball of claim 1 wherein the diameter of said center core is in the range of 29-37 mm.]

[6. The golf ball of claim 1 wherein a difference in the specific gravity between the center core and the intermediate layer is in the range of 0.1 to 0.5.]

[7. The golf ball of claim 1 wherein the specific gravity of said intermediate layer is in the range of 0.9 to 1.0.]

[8. The golf ball of claim 1 wherein the hardness of said intermediate layer is in the range of 85-100 on JIS C.]

*9. A three-piece solid golf ball, comprising:*

*a center core, an intermediate layer, and a cover enclosing said center core through the intermediate layer;*

*said center core having a diameter of at least 29 mm and a specific gravity of less than 1.4;*

*said intermediate layer formed of an ionomer resin and having a thickness of at least 1 mm, a specific gravity of less than 1.2, and a hardness of at least 85 on JIS C scale, the specific gravity of said intermediate layer being lower than the specific gravity of said center core; and*

*said cover having a thickness of 1 to 3 mm and being softer than said intermediate layer; and*

*wherein said cover comprises thermoplastic polyester.*

* * * * *